United States Patent
Watanabe et al.

(10) Patent No.: US 8,323,517 B2
(45) Date of Patent: Dec. 4, 2012

(54) METHOD OF FORMING MAGNETIC POLE SECTION OF PERPENDICULAR MAGNETIC RECORDING TYPE THIN-FILM MAGNETIC HEAD AND MANUFACTURING METHOD OF PERPENDICULAR MAGNETIC RECORDING TYPE THIN-FILM MAGNETIC HEAD

(75) Inventors: Hisayoshi Watanabe, Tokyo (JP); Hideyuki Yatsu, Tokyo (JP); Masachika Hashino, Tokyo (JP); Koichi Otani, Tokyo (JP)

(73) Assignee: TDK Corporation, Tokyo (JP)

( * ) Notice: Subject to any disclaimer, the term of this patent is extended or adjusted under 35 U.S.C. 154(b) by 391 days.

(21) Appl. No.: 12/753,557

(22) Filed: Apr. 2, 2010

(65) Prior Publication Data
US 2011/0240593 A1    Oct. 6, 2011

(51) Int. Cl.
*B29D 11/00*    (2006.01)
(52) U.S. Cl. .......................... 216/22; 360/317; 368/126
(58) Field of Classification Search .............. 216/22, 216/37, 67; 368/126; 360/119, 122, 126, 360/317, 125
See application file for complete search history.

(56) References Cited

U.S. PATENT DOCUMENTS

| | | | |
|---|---|---|---|
| 5,075,956 A | 12/1991 | Das | |
| 6,954,340 B2 | 10/2005 | Shukh et al. | |
| 2007/0195457 A1* | 8/2007 | Matono et al. | 360/126 |
| 2008/0273273 A1* | 11/2008 | Yokoyama et al. | 360/314 |
| 2009/0067093 A1* | 3/2009 | Haginoya et al. | 360/234.3 |

* cited by examiner

*Primary Examiner* — Lan Vinh
*Assistant Examiner* — Maki Angadi
(74) *Attorney, Agent, or Firm* — Oliff & Berridge, PLC

(57) ABSTRACT

A method of forming a magnetic pole section of a perpendicular magnetic recording type thin-film magnetic head and a method of manufacturing a perpendicular magnetic recording type thin-film magnetic head that include forming on an under layer a resist pattern having an opening, forming a first nonmagnetic layer, forming a first magnetic layer forming a magnetic layer pattern, removing the resist pattern and then applying a resist layer onto a first nonmagnetic layer and a magnetic layer pattern, developing or ashing partway the applied resist layer and baking the remaining resist layer, removing the first nonmagnetic layer from at least a side surface of the magnetic layer pattern by etching with the baked resist layer being left, removing all of the resist layer and then forming a second nonmagnetic layer on at least the magnetic layer pattern, and forming a second magnetic layer on the formed second nonmagnetic layer.

14 Claims, 9 Drawing Sheets

METHOD OF FORMING MAGNETIC POLE SECTION OF PERPENDICULAR MAGNETIC RECORDING TYPE THIN-FILM MAGNETIC HEAD AND MANUFACTURING METHOD OF PERPENDICULAR MAGNETIC RECORDING TYPE THIN-FILM MAGNETIC HEAD

BACKGROUND OF THE INVENTION

1. Field of the Invention

The present invention relates to a method of forming a magnetic pole section of a perpendicular magnetic recording type thin-film magnetic head and a method of manufacturing a perpendicular magnetic recording type thin-film magnetic head.

2. Description of the Related Art

With the increase in the recording densities of magnetic recording media such as hard disks, a shift is occurring from horizontal magnetic recording to perpendicular magnetic recording. Perpendicular magnetic recording has advantages that it provides higher linear recording density and makes recorded magnetic recording media less susceptible to thermal fluctuations.

A perpendicular magnetic recording type thin-film magnetic head includes a thin-film coil which generates a write field and a magnetic pole which extends backward from an air bearing surface (ABS) and guides a perpendicular magnetic field to a magnetic recording medium. The width of the trailing edge (trailing edge width) of a magnetic pole of the perpendicular magnetic recording type thin-film magnetic head that defines the recording track-width needs to be made as small as possible to cope with increasing surface recording densities.

US 2007/0195457A1 discloses a method of manufacturing a perpendicular magnetic recording type thin-film magnetic head that can reduce the trailing edge width. In the method, a resist pattern having an opening is formed, a nonmagnetic layer is formed so as to narrow the opening by covering an inner wall of the resist pattern, a magnetic layer is formed on the nonmagnetic layer in the opening, and then the surface is polished until the resist pattern is exposed to form a pattern of a main pole.

U.S. Pat. No. 5,075,956A and U.S. Pat. No. 6,954,340B disclose techniques which improve recording density by providing a shield (wrap around shield) that has an edge disposed to surround an edge of a main pole on the surface that faces a magnetic recording medium.

A nonmagnetic layer forms a gap between the wrap around shield and the main pole. The wrap around shield has the function of intercepting a magnetic flux that is generated from the edge of the main pole disposed on the surface facing the magnetic recording medium and extends in directions except the direction perpendicular to the surface facing the magnetic recording medium, thereby preventing the magnetic flux from reaching the magnetic recording medium. The wrap around shield includes a lower shield disposed on the air inflow end side of the slider with respect to the main pole, an upper shield disposed on the air outflow end side of the slider with respect to the main pole, and first and second side shields disposed on both sides of the main pole in the track-width direction. The gap includes a lower gap positioned between the main pole and the lower shield, an upper gap positioned between the main pole and the upper shield, and two side gaps positioned between the main pole and the two side shields. According to the technique, magnetic field gradient can be increased by the upper and lower shields and adjacent track erasing can be suppressed by the two side shields. These effects can increase the recording density.

A method of forming the side shields among the wrap around shields will be discussed below.

FIGS. 1a to 1d are cross-sectional views of side shields viewed from the ABS for explaining a conventional side shield forming method. FIGS. 2a and 2b are cross-sectional views of the side shields viewed from the ABS for explaining a problem with the method.

First, a pattern of a main pole is formed by the method disclosed in US 2007/0195157A1 and then the resist pattern is removed. The result is illustrated in FIG. 1a. Specifically, depicted in FIG. 1a are a main pole 10 formed, a nonmagnetic layer 11 of alumina ($Al_2O_3$), for example, formed on the side surfaces of the main pole 10, a nonmagnetic layer 12 of alumina formed under the main pole 10, and an under layer 13 of a nonmagnetic material such as alumina. In FIG. 1a, the distance between the bottom end of the main pole layer 10 and the top surface of the under layer 13, that is, the thickness of the nonmagnetic layer 12, is denoted by $h_1$.

Then, etching is performed with an alkaline solution to remove the nonmagnetic layer 11. In this case, by the etching, the nonmagnetic layer 12 formed under the main pole 10 is removed and a portion of the under layer 13 is removed to produce an under layer 13' with a reduced thickness as illustrated in FIG. 1b. In FIG. 1b, $h_2$ denotes the thickness of the removed portion of the under layer 13.

Then, alumina is deposited by chemical vapor deposition (CVD) to form a nonmagnetic side shield gap layer 14 on the side surfaces of the main pole 10. By the deposition, a nonmagnetic layer 15 of alumina is also deposited below the main pole 10 as well as on the side surfaces of the main pole 10 as depicted in FIG. 1c. In FIG. 1c, the thickness of the side shield gap layer 14 or the nonmagnetic layer 15 is denoted by a.

Then, the top surface is plated with a magnetic material to form a side shield layer 16 as depicted in FIG. 1d.

In the conventional side shield forming method as described above, if the thickness of the nonmagnetic layer 11 is increased in order to reduce the width of the main pole 10 in the track-width direction, the thickness $h_1$ of the nonmagnetic layer 12 is also increased. Accordingly, the amount of etching by the alkaline solution for removing the nonmagnetic layers 11 and 12 also increases and therefore the depth to which the under layer 13 is removed increases, that is, $h_2$ increases.

In this case, if the thickness a of the side shield gap layer 14 subsequently formed on the side surfaces of the main pole 10 is sufficiently large, that is, if $2a > h_1 + h_2$, the nonmagnetic layers 14 and 15 under the main pole 10 will be continuous as depicted in FIG. 2a after the alkaline etching and therefore a problem which will be described later does not arise. However, if the thickness a of the side shield gap layer 14 is small, that is, if $2a < h_1 + h_2$, the nonmagnetic layers 14' and 15' under the main pole 10 will be discontinuous and separated to form space in the region after the alkaline etching. Consequently, an unwanted lower shield layer will be formed in such space in the subsequent shield layer formation process. That is, the shape of the side shield layer will be distorted (deformation).

SUMMARY OF THE INVENTION

It is therefore an object of the present invention to provide a method of forming a magnetic pole section of a perpendicular magnetic recording type thin-film magnetic head and a method of manufacturing a perpendicular magnetic recording type thin-film magnetic head that are capable of forming a side shield layer of a desired shape that does not deform even if the thickness of a side shield gap layer on side surfaces of a main pole is reduced.

According to the present invention, there are provided a method of forming a magnetic pole section of a perpendicular magnetic recording type thin-film magnetic head and a method of manufacturing a perpendicular magnetic recording type thin-film magnetic head, including a first step of forming on an under layer a resist pattern having an opening, a second step of forming a first nonmagnetic layer to cover an interior wall of the resist pattern at least in the opening so as to narrow the opening, a third step of forming a first magnetic layer to at least fill the opening in which the first nonmagnetic layer has been formed, a fourth step of forming a magnetic layer pattern in the opening by selectively removing the first nonmagnetic layer and the first magnetic layer until the resist pattern is exposed, a fifth step of removing the resist pattern and then applying a resist layer onto the first nonmagnetic layer and the magnetic layer pattern; a sixth step of developing or ashing partway the applied resist layer and baking the remaining resist layer, a seventh step of removing the first nonmagnetic layer from at least a side surface of the magnetic layer pattern by etching with the baked resist layer being left, an eighth step of removing all of the resist layer and then forming a second nonmagnetic layer on at least the magnetic layer pattern, and a ninth step of forming a second magnetic layer on the formed nonmagnetic layer.

After the magnetic layer pattern has been formed, development or ashing of the applied resist layer is performed partway, the remaining resist layer is baked, and the nonmagnetic layer is removed from at least the side surface of the magnetic layer pattern by etching with the resist layer being left. Accordingly, only the nonmagnetic layer on the side surfaces of the magnetic layer pattern that is not protected by the remaining resist layer is removed whereas the nonmagnetic layer under the magnetic layer pattern is not removed. Consequently, even if the thickness of the side shield gap layer on the side surfaces of the main pole is reduced, the nonmagnetic layer under the magnetic layer pattern does not become discontinuous and separate to form space in the region. This avoids formation of an unwanted lower shield layer in such space in the subsequent shield layer formation process. That is, the side shield layer of a desired shape without deformation can be formed.

The seventh step preferably includes a step of removing the first nonmagnetic layer except a portion of the first nonmagnetic layer or removing the entire first nonmagnetic layer.

The eighth step preferably includes a step of forming the second nonmagnetic layer by using an Atomic Layer Deposition (ALD) method.

The fourth step preferably includes a step of removing the first nonmagnetic layer and the first magnetic layer by polishing.

The third step preferably includes a step of forming a seed layer on the first nonmagnetic layer and then growing a plated layer on the seed layer to form the first magnetic layer.

The ninth step preferably includes a step of forming a seed layer on the second nonmagnetic layer and then growing a plated layer on the seed layer to form the second magnetic layer.

Further objects and advantages of the present invention will be apparent from the following description of the preferred embodiments of the invention as illustrated in the accompanying drawings.

DESCRIPTION OF THE PREFERRED EMBODIMENTS

Figure 1A:
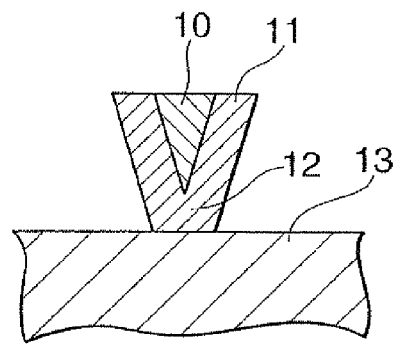
FIGS. 1a to 1d are cross-sectional views of side shields viewed from an ABS for explaining a conventional side shield forming method described above.
Figure 1B:
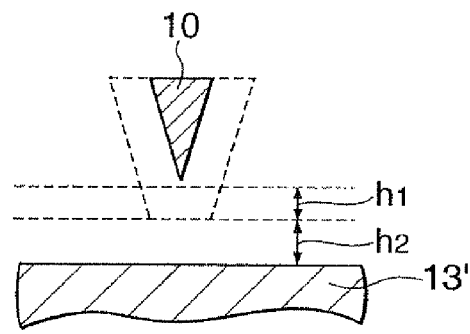
Figure 1C:
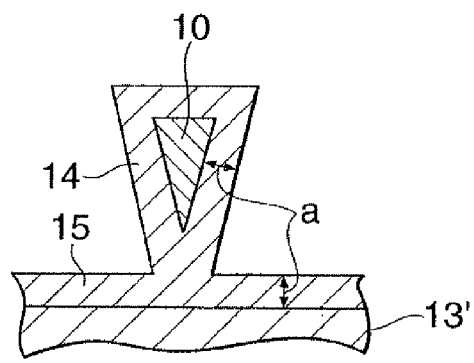
Figure 1D:
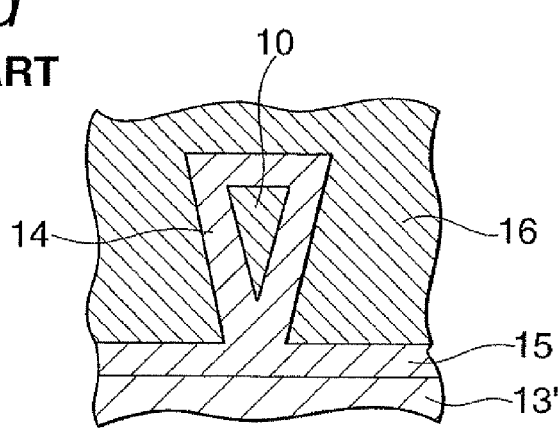
Figure 2A:
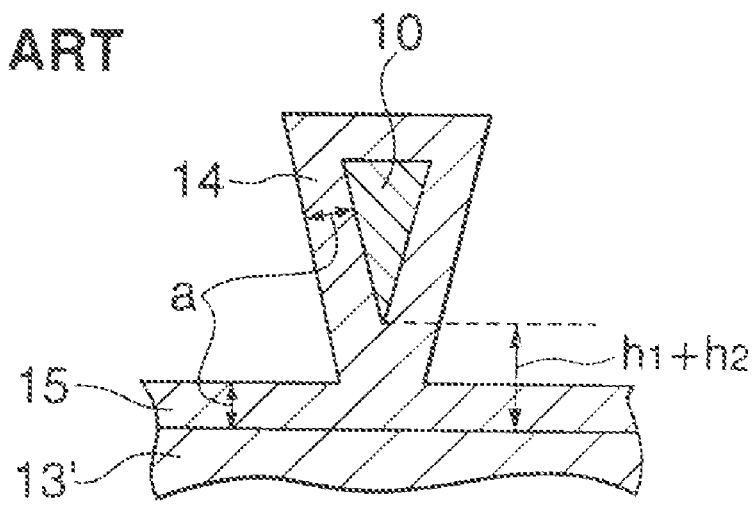
FIGS. 2a and 2b are cross-sectional views of the side shields viewed from the ABS for explaining a problem with the conventional side shield forming method described above.
Figure 2B:
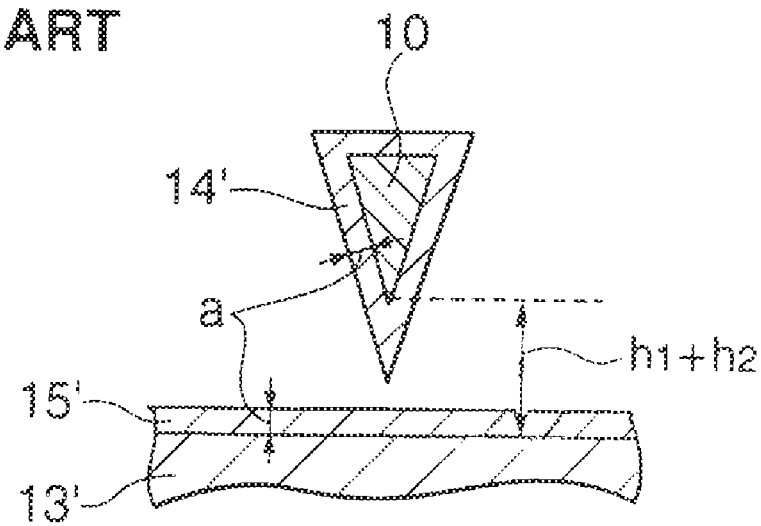
Figure 3:
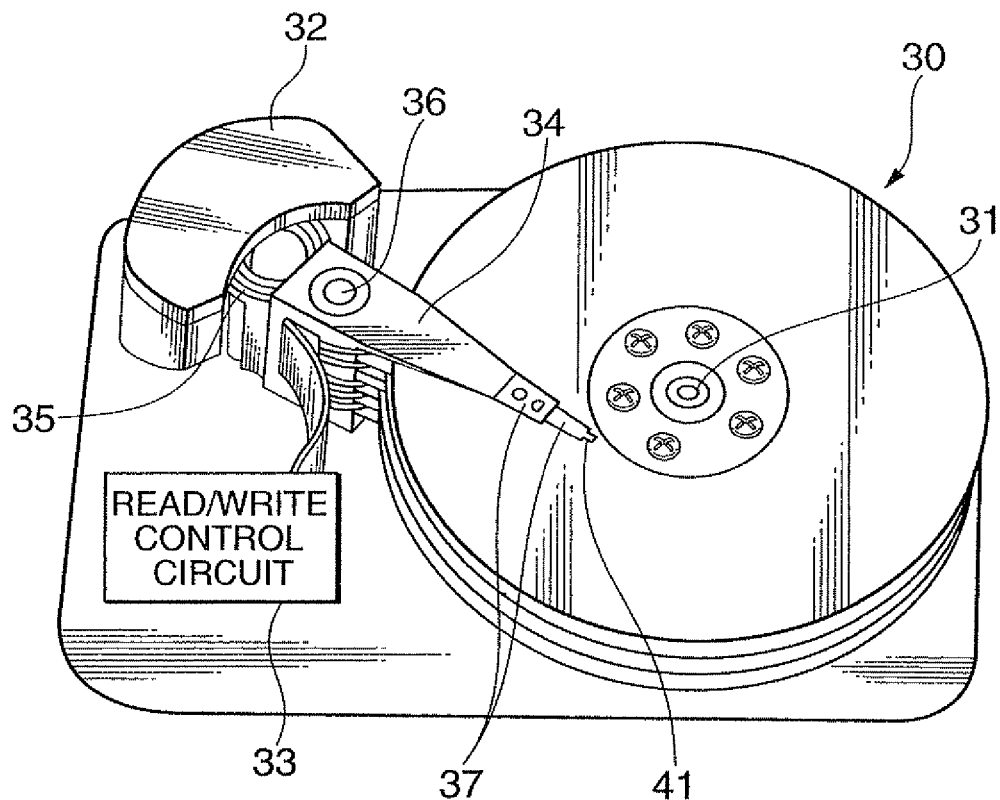
FIG. 3 is a perspective view schematically illustrating a configuration of a subject part of an exemplary magnetic disk drive apparatus including a perpendicular magnetic recording type thin-film magnetic head manufactured by a manufacturing method according to the present invention.
Figure 4:
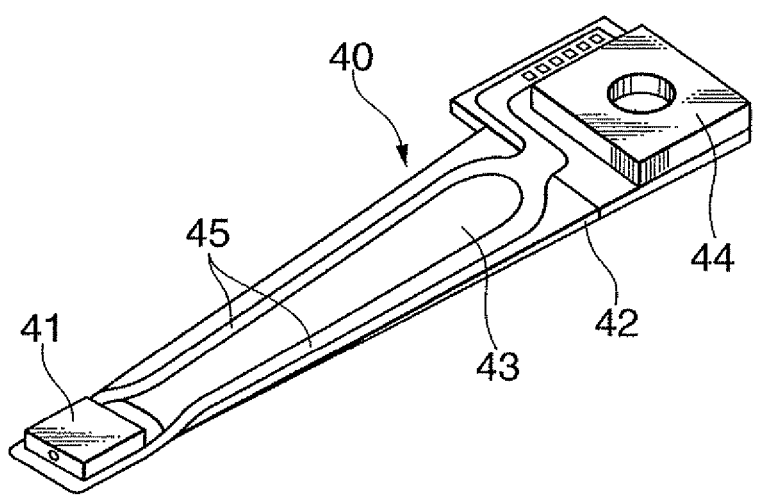
FIG. 4 is a perspective view illustrating an exemplary configuration of a head gimbal assembly (HGA) in FIG. 3.
Figure 5:
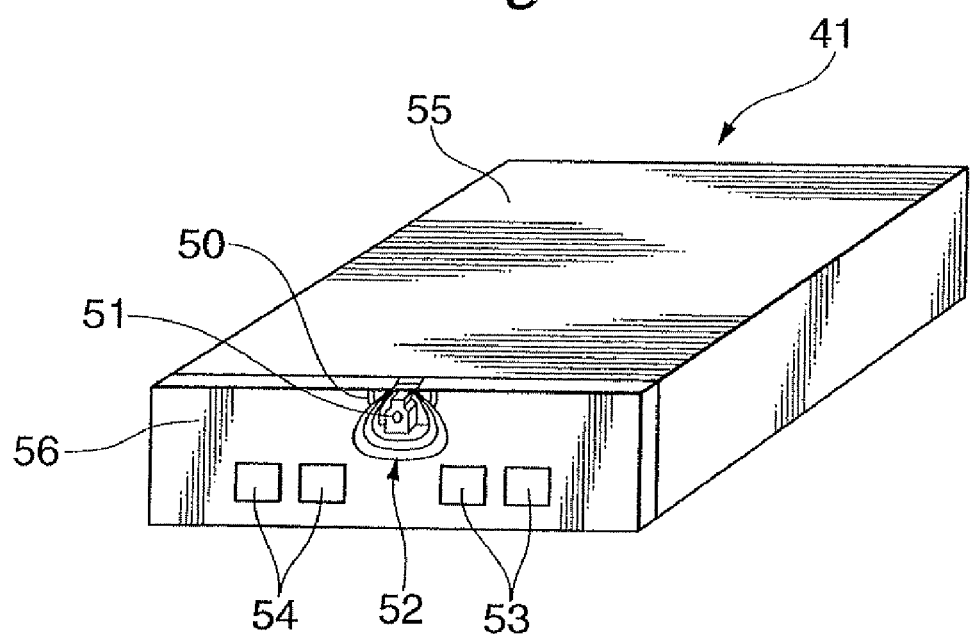
FIG. 5 is a perspective view of the thin-film magnetic head attached to the front end of the HGA in FIG. 4.
Figure 6:
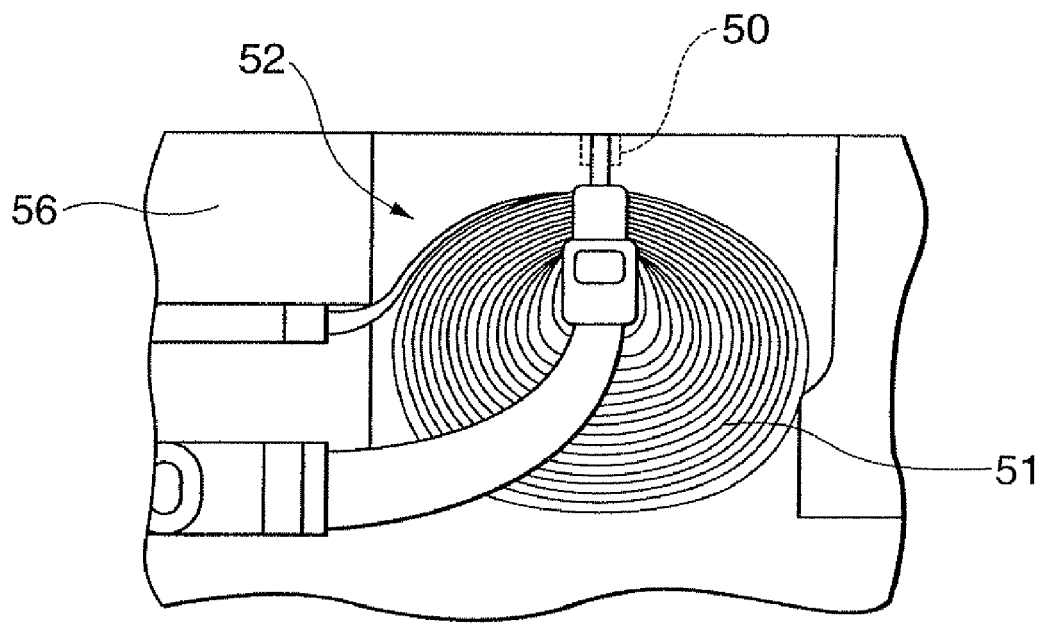
FIG. 6 is a plan view of a magnetic head element of the thin-film magnetic head in FIG. 5 viewed from an element-formed surface of a slider substrate.

FIG. 3 schematically illustrates a configuration of a subject part of an exemplary magnetic disk drive apparatus including a perpendicular magnetic recording type thin-film magnetic head manufactured by a manufacturing method according to the present invention. FIG. 4 illustrates an exemplary configuration of an HGA in FIG. 3. FIG. 5 illustrates the thin-film magnetic head attached to the front end of the HGA in FIG. 4. FIG. 6 illustrates the side surface of a magnetic head element of the thin-film magnetic head in FIG. 5 viewed from an element-formed surface of a slider substrate.

Depicted in FIG. 3 are multiple magnetic disks 30 which rotate about the rotation axis of a spindle motor 31, an assembly carriage device 32 for positioning the perpendicular magnetic recording type thin-film magnetic head (magnetic head slider) above a track, and a recording/reproducing control circuit 33 for controlling read and write operations of the thin-film magnetic head.

Multiple drive arms 34 are provided in the assembly carriage device 32. The drive arms 34 are driven by a voice coil motor (VCM) 35, are angularly pivotable about a pivot bearing axis 36, and are stacked along the axis 36. An HGA 37 is attached to the front end of each drive arm 34. A perpendicular magnetic recording type thin-film magnetic head (magnetic head slider) 41 is provided on each HGA 37 in such a manner that the head faces the surface of each magnetic disk 30. A single set of a magnetic disk 30, a drive arm 34 and an HGA 37 may be provided in the magnetic disk drive apparatus, rather than providing multiple sets.

As depicted in FIG. 4, the HGA is fabricated by fixing a perpendicular magnetic recording type thin-film magnetic head 41 including a tunnel magnetoresistive effect (TMR) read head element and a perpendicular magnetic recording type inductive write head element to the front end of a suspension 40 and by electrically connecting one end of a wiring member 45 to a terminal electrode of the thin-film magnetic head 41.

The suspension 40 includes, as main components, a load beam 42 which produces a load to be applied to the thin-film magnetic head 41, an elastic flexure 43 fixed onto and supported by the load beam 42, a base plate 44 provided at the base of the load beam 42, and the wiring member 45 which is provided on the flexure 43 and the load beam 42 and includes a lead conductor and connection pads electrically connected to both ends of the lead conductor.

It will be apparent that the structure of the suspension in the present invention is not limited to the one described above. Although not shown, a head driving IC chip may be attached somewhere along the length of the suspension 40.

As illustrated in FIGS. 5 and 6, the thin-film magnetic head 41 includes a thin-film magnetic head 52 including a TMR read head element 50 and a perpendicular magnetic recording type inductive write head element 51 stacked on top of each other and four signal terminal electrodes 53 and 54 connected to the TMR read head element 50 and the perpendicular magnetic recording type inductive write head element 51 on its element-formed surface 56 which is located on one side of the magnetic head slider when the ABS 55 is assumed to be the bottom of the head slider. The number and positions of the terminal electrodes are not limited to those in the implementation in FIG. 5.

Figure 7:
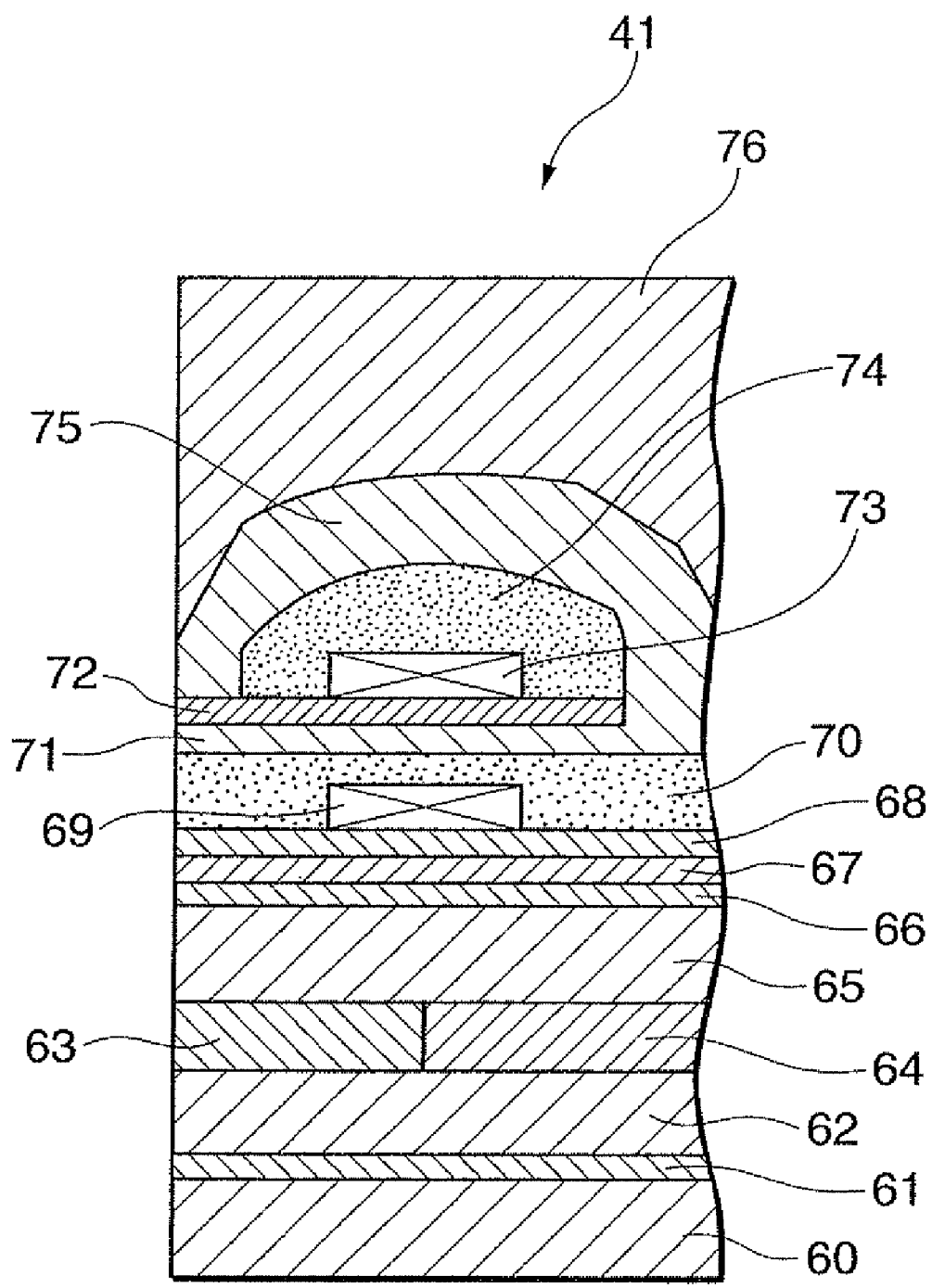
FIG. 7 is a central cross-sectional view schematically illustrating a structure of the thin-film magnetic head in FIG. 5.

FIG. 7 schematically illustrates a structure of the thin-film magnetic head. However, FIG. 7 depicts a central cross-section taken along a plane perpendicular to the ABS of the thin-film magnetic head and to the track-width direction.

While the read head element is of TMR type and the write head element is of perpendicular magnetic recording type in the example, the write head element may be of in-plane type, that is, horizontal magnetic recording type, and the read head element may be of giant magnetoresistive effect (GMR) type.

An ABS 55 which faces the surface of a magnetic disk during flying is formed on a slider substrate 60 made of a conductive material such as Al—TiC ($Al_2O_3$—TiC) (see FIG. 5). In operation, the thin-film magnetic head 41 aerodynamically is flying above the surface of the rotating magnetic disk at a predetermined flying height. An insulating under layer 61 of an insulating material such as alumina ($Al_2O_3$) or silicon oxide ($SiO_2$) with a thickness in the range from 0.05 to 10 µm is formed on the element-formed surface 56 of the slider substrate 60. A lower shield layer 62 of a metal magnetic material such as iron aluminum silicon (FeAlSi), nickel iron (NiFe), cobalt iron (CoFe), nickel iron cobalt (NiFeCo), iron nitride (FeN), iron zirconium nitride (FeZrN), iron tantalum nitride (FeTaN), cobalt zirconium niobium (CoZrNb), or cobalt zirconium tantalum (CoZrTa), which also functions as a lower electrode layer, is formed on the insulating under layer 61. A TMR multi-layered structure 63 and an insulation layer 64 of an insulating material such as $Al_2O_3$ or $SiO_2$ are formed on the lower shield layer 62.

The TMR multi-layered structure 63 has a multilayer structure that includes, as its main components, a section functioning as a magnetization fixed layer including a pinning layer and a pinned layer made of an anti-ferromagnetic material, a tunnel barrier layer, and a section functioning as a magnetization free layer. A section functioning as a magnetic-domain control bias layer, not depicted in FIG. 5, for controlling the magnetic domain of the free layer is formed on a side surface of the TMR multi-layered structure in the track-width direction.

An upper shield layer 65 of a metal magnetic material such as FeAlSi, NiFe, CoFe, NiFeCo, FeN, FeZrN, FeTaN, CoZrNb, or CoZrTa which also functions as an upper electrode layer is formed on the TMR multi-layered structure 63 and the insulation layer 64.

The lower shield layer 62, the TMR multi-layered structure 63, the insulation layer 64, the upper shield layer 65, and the section functioning as the magnetic-domain control bias layer make up the TMR read head element.

The perpendicular magnetic recording type inductive write head element is formed above the TMR read head element with an insulation layer 66 and a soft magnetic layer 67 between them. The perpendicular magnetic recording inductive write head element includes an insulation layer 86 made of an insulating material such as $Al_2O_3$ or $SiO_2$, a backing coil layer 69 made of a conductive material such as copper (Cu), a backing coil insulation layer 70 made of a resist such as a heat-cured novolac-type resist, a main pole layer 71 made of a metal magnetic material such as FeAlSi, NiFe, CoFe, NiFeCo, FeN, FeZrN, FeTaN, CoZrNb, or CoZrTa or a multilayer of any of these materials, an insulation gap layer 72 made of an insulating material such as $Al_2O_3$, or $SiO_2$, a write coil layer made of a conductive material such as Cu, a write coil insulation layer 74 made of a resist such as a heat-cured novolac-type resist, and an auxiliary pole layer made of a metal magnetic material such as FeAlSi, NiFe, CoFe, NiFeCo, FeN, FeZrN, FeTaN, CoZrNb, or CoZrTa or a multilayer of any of these materials. An overcoat layer 76 made of $Al_2O_3$ or $SiO_2$, for example, is provided on the inductive write head element.

FIGS. 8a to 8l illustrate a cross section viewed from the ABS illustrating a part of a process of fabricating a main pole and its side shield layer of a write head element of a thin-film magnetic head, as one embodiment of the manufacturing method of the present invention. Referring to these figures, the process of fabricating the main pole and the side shield layer will be described below.

Figure 8A:
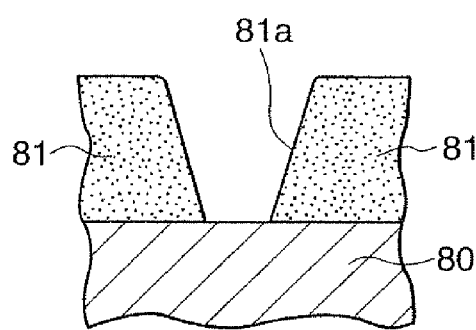
FIGS. 8a to 8l are cross-sectional views illustrating a part of a manufacturing process of a magnetic pole of a write head of a thin-film magnetic head and a side shield layer of the main pole as an embodiment of a manufacturing method of the present invention, viewed from the ABS.

First, a resist pattern 81 having an opening 81a is formed on the under layer 80 made of a nonmagnetic material, for example alumina, as illustrated in FIG. 8a. To form the resist pattern 81a, a resist is applied onto the surface of the under layer 80 to form a resist film and then the resist film is patterned (exposed to light and developed) by using a method such as photolithography. In the patterning, the exposure conditions are controlled so that the opening 81a gradually widens with the distance from the under layer 80.

Figure 8B:
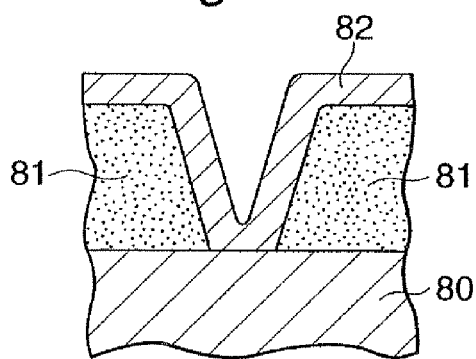

Then, a nonmagnetic layer 82 is formed to cover the surface and the interior wall of the resist pattern 81 and the exposed surface of the under layer 80 in the opening 81a by using a dry film deposition method such as atomic layer deposition (ALD) as illustrated in FIG. 8b. Forming the nonmagnetic layer 82 in this manner can narrow the opening 81a and can reduce the width of the main pole in the track-width direction which will be formed in the opening 81a. The temperature for forming the film by the ALD (the substrate temperature) is kept lower than the deformation temperature (glass transition temperature) of the resist pattern 81. The ALD method allows the interior wall of the resist pattern to be covered with the nonmagnetic layer 82 with a uniform thickness.

Figure 8C:
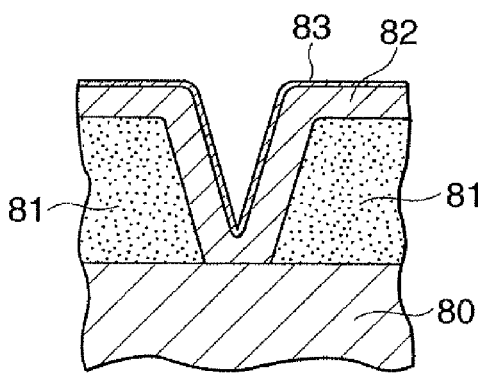

Then, a seed layer 83 for plating is formed on the nonmagnetic layer 82 by a method such as sputtering as illustrated in FIG. 8c.

Figure 8D:
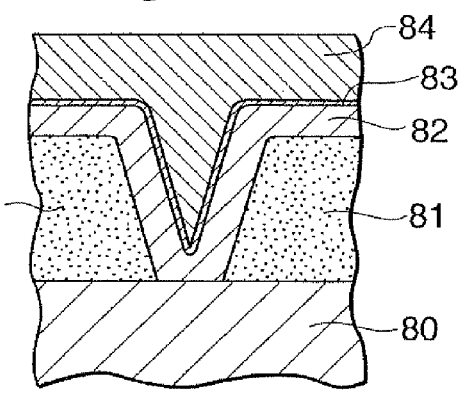

Then, as illustrated in FIG. 8d, a magnetic layer 84 from which a main pole is to be formed is formed to fill the opening 81a in which the nonmagnetic layer 82 and the seed layer 83 have been formed. Specifically, a plated layer is grown by using the seed layer 83 as an electrode film to form the magnetic layer 84 on the seed layer 83 by plating to fill the opening 81*a*.

Figure 8E:
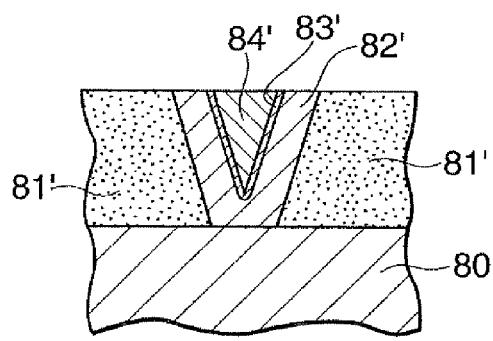

Then, as illustrated in FIG. 8*e*, the magnetic layer 84, the seed layer 83 and the nonmagnetic layer 82 are selectively removed until at least the resist pattern 81 is exposed to produce a magnetic layer 84', a seed layer 83', a nonmagnetic layer 82' and a resist pattern 81' that have a flat top surface. That is, a magnetic layer pattern 84' corresponding to the main pole is formed in the opening 81*a*. As the selective removal, a polishing method such as chemical mechanical polishing (CMP) or an etching method such as ion milling or reactive ion etching (RIE) can be used.

Figure 8F:
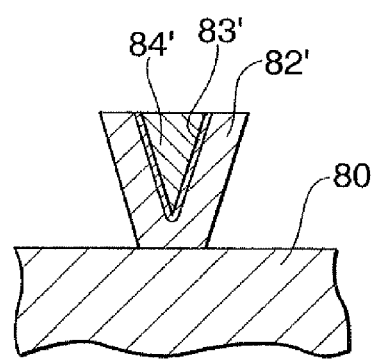

Then, the remaining resist pattern 81' is removed as illustrated in FIG. 8*f* by cleaning by an organic solvent or ashing.

Figure 8G:
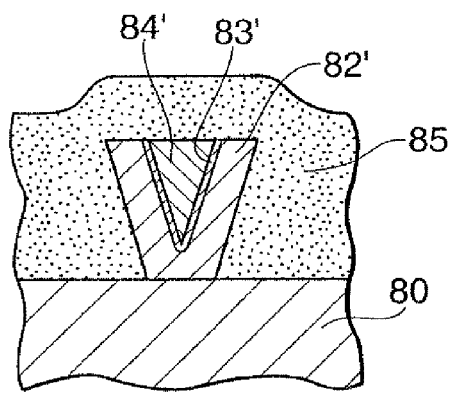

Then, the under layer 80, the magnetic layer 84', the seed layer 83' and the nonmagnetic layer 82' is coated with a resist layer 85 as illustrated in FIG. 8*g*.

Figure 8J:
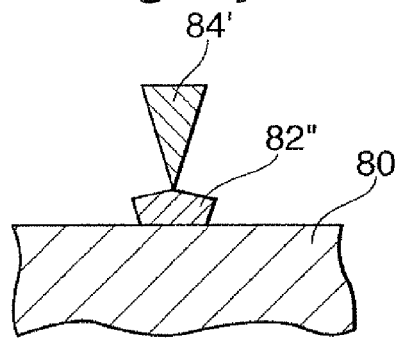
Figure 8H:
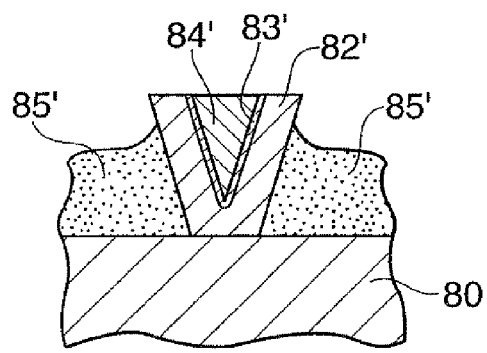

Then, the resist layer 85 is exposed to light and is developed partway or ashing of the resist layer 85 is performed partway, as illustrated in FIG. 8*h*, and then the remaining resist layer 85' is baked to improve the etch resistance of the remaining resist layer 85'.

Figure 8K:
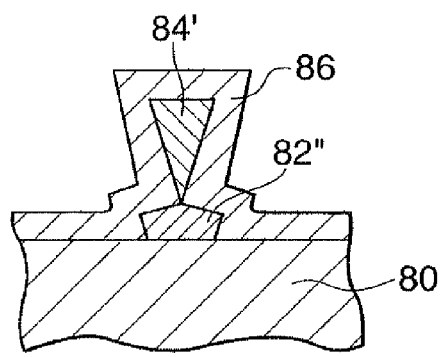
Figure 8I:
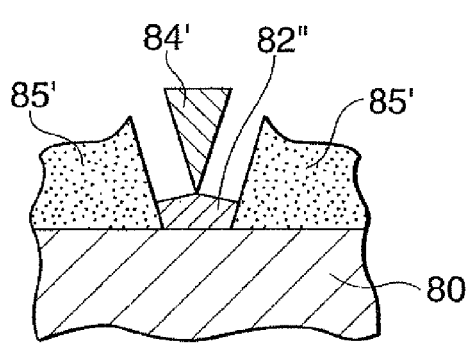

Then, etching is performed using an alkaline solution with the baked resist layer 85' being left to preferentially remove the seed layer 83' and the nonmagnetic layer 82' from the side surfaces of the magnetic layer 84' as illustrated in FIG. 8*i*. That is, only the seed layer 83' and the nonmagnetic layer 82' on the side surfaces of the magnetic layer 84' are removed while the nonmagnetic layer 82' under the magnetic layer 84' is not removed but is left as a nonmagnetic layer 82". If the nonmagnetic layer 82' is made of alumina, an alkaline solution is used as the etchant so as not to etch NiFe. An alkaline solution may also be used if the nonmagnetic layer 82' is made of Cu or silicon (Si).

Then, the remaining resist pattern 85' is removed as illustrated in FIG. 8*j*, by cleaning with an organic solvent or ashing, for example.

Then, a nonmagnetic layer 86 of alumina is formed on the top as illustrated in FIG. 8*k* by using a method such as ALD. The nonmagnetic layer 86 will act as a side shield gap layer formed on the side surfaces of the magnetic layer 84', which will be the main pole. Since the nonmagnetic layer 82" is left under the magnetic layer 84', the nonmagnetic layer under the magnetic layer 84' is prevented from becoming discontinuous and separated to form space in the region even if the nonmagnetic layer 86 is thin. Accordingly, an unwanted lower shield layer will not be formed in such space in the subsequent shield layer formation process. That is, distortion of the shape (deformation) of the side shield layer is prevented.

Figure 8L:
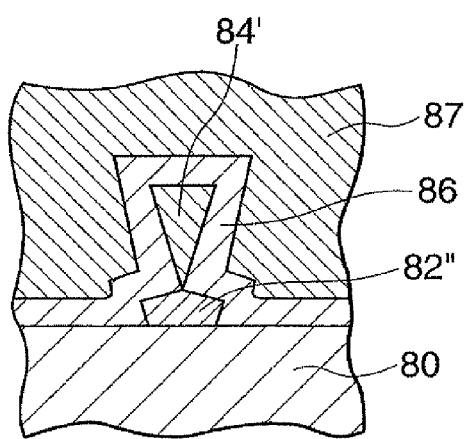

Then, the side shield layer 87 is formed on the top as illustrated in FIG. 8*l* by plating with a magnetic material.

In the present embodiment, the magnetic layer 84' is formed and then development or ashing of the applied resist layer 85 is performed partway, the remaining resist layer 85' is baked, and the nonmagnetic layer 82' is removed from at least the side surfaces of the magnetic layer 84' by etching with the resist layer 85' being left, as has been described above. Accordingly, only the nonmagnetic layer 82' on the side surfaces of the magnetic layer 84' that is not protected by the remaining resist layer 85' is removed whereas the nonmagnetic layer 82" under the magnetic layer 84' is not removed. Consequently, the nonmagnetic layer under the main pole is prevented from becoming discontinuous and separated to form space in the region when the thickness of the sides shield gap layer on the side surfaces of the main pole is reduced. Therefore, formation of an unwanted lower shield layer in such space in the subsequent shield layer formation process is prevented. That is, a side shield layer of a desired shape without deformation can be formed.

FIGS. 9*a* to 9*l* illustrate a cross section viewed from the ABS illustrating a part of a process of fabricating a main pole and its side shield layer of a write head element of a thin-film magnetic head, as another embodiment of the manufacturing method of the present invention. Referring to these figures, the process of fabricating the main pole and the side shield layer will be described below.

Figure 9A:
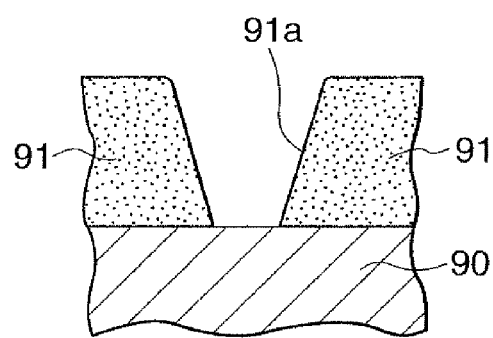
FIGS. 9a to 9l are cross-sectional views illustrating a part of a manufacturing process of a magnetic pole of a write head of a thin-film magnetic head and a side shield layer of the main pole as another embodiment of a manufacturing method of the present invention, viewed from the ABS.

First, a resist pattern 91 having an opening 91*a* is formed on the under layer 90 made of a nonmagnetic material, for example alumina, as illustrated in FIG. 9*a*. To form the resist pattern 91*a*, a resist is applied onto the surface of the under layer 90 to form a resist film and then the resist film is patterned (exposed to light and developed) by a method such as photolithography. In the patterning, the exposure conditions are controlled so that the opening 91*a* gradually widens with the distance from the under layer 90.

Figure 9D:
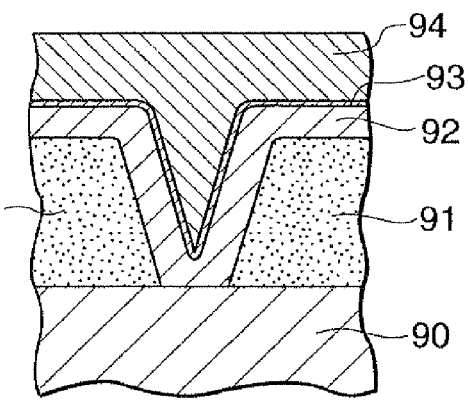
Figure 9B:
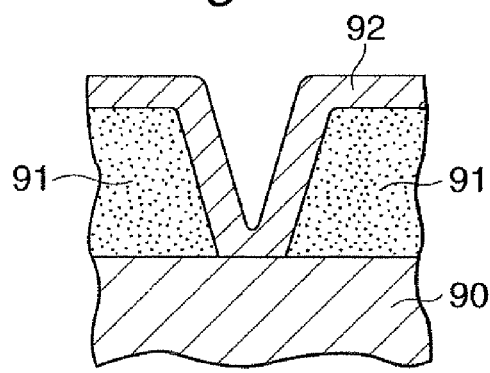

Then, a nonmagnetic layer 92 is formed to cover the surface and the interior wall of the resist pattern 91 and the exposed surface of the under layer 90 in the opening 91*a* by a dry film deposition method such as atomic layer deposition (ALD) as illustrated in FIG. 9*b*. Forming the nonmagnetic layer 92 in this manner can narrow the opening 91*a* and can reduce the width of the main pole in the track-width direction which will be formed in the opening 91*a*. The temperature for forming the film by the ALD (the substrate temperature) is kept lower than the deformation temperature (glass transition temperature) of the resist pattern 91. The ALD method allows the interior wall of the resist pattern to be covered with the nonmagnetic layer 92 with a uniform thickness.

Figure 9E:
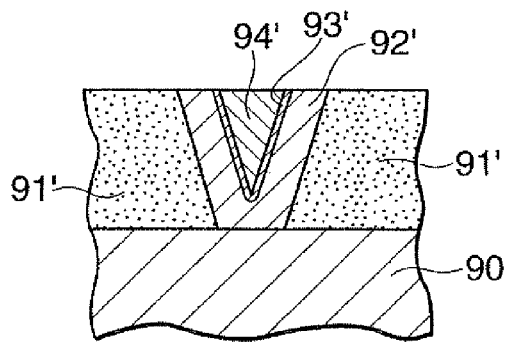
Figure 9C:
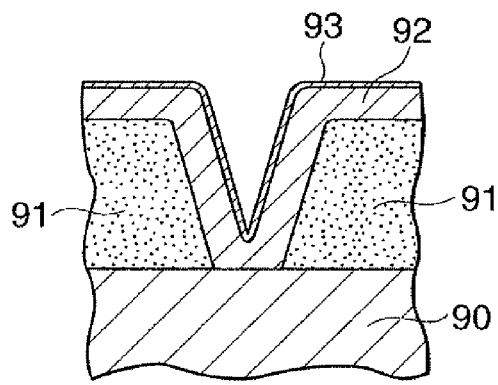

Then, a seed layer 93 for plating is formed on the nonmagnetic layer 92 by a method such as sputtering as illustrated in FIG. 9*c*.

Then, as illustrated in FIG. 9*d*, a magnetic layer 94 from which a main pole is to be formed is formed to fill the opening 91*a* in which the nonmagnetic layer 92 and the seed layer 93 have been formed. Specifically, a plated layer is grown by using the seed layer 93 as an electrode film to form the magnetic layer 94 on the seed layer 93 by plating to fill the opening 91*a*.

Then, as illustrated in FIG. 9*e*, the magnetic layer 94, the seed layer 93 and the nonmagnetic layer 92 are selectively removed until at least the resist pattern 91 is exposed to produce a magnetic layer 94', a seed layer 93', a nonmagnetic layer 92' and a resist pattern 91' that have a flat top surface. That is, a magnetic layer pattern 94' corresponding to the main pole is formed in the opening 91*a*. As the selective removal, a polishing method such as CMP or an etching method such as ion milling or RIE can be used.

Figure 9F:
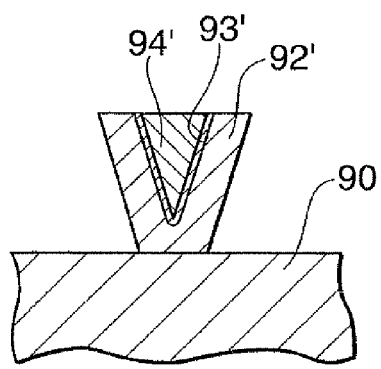

Then, the remaining resist pattern 91' is removed as illustrated in FIG. 9*f* by cleaning by an organic solvent or ashing.

Figure 9G:
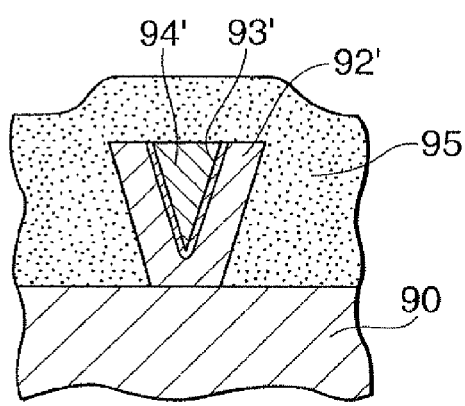

Then, the under layer 90, the magnetic layer 94', the seed layer 93' and the nonmagnetic layer 92' is coated with a resist layer 95 as illustrated in FIG. 9*g*.

Figure 9J:
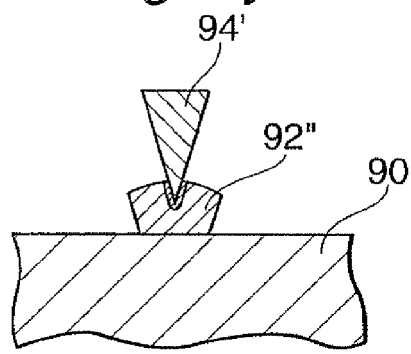
Figure 9H:
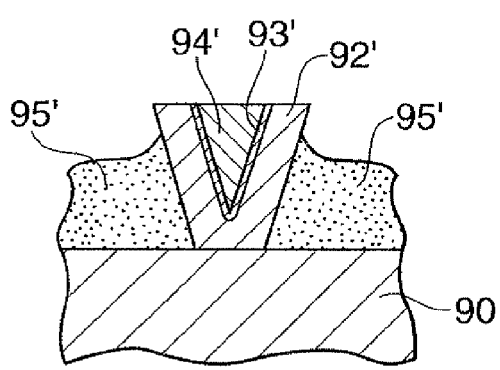

Then, the resist layer 95 is exposed to light and is developed partway or ashing of the resist layer 95 is performed partway, as illustrated in FIG. 9*h*, and then the remaining resist layer 95' is baked to improve the etch resistance of the remaining resist layer 95'.

Figure 9K:
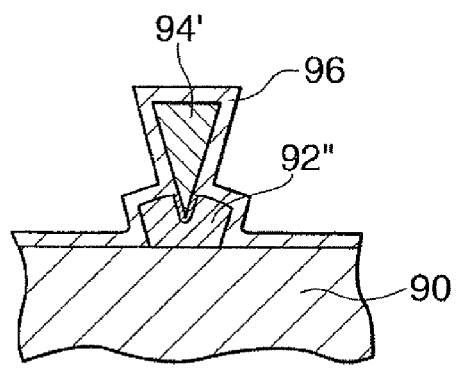
Figure 9I:
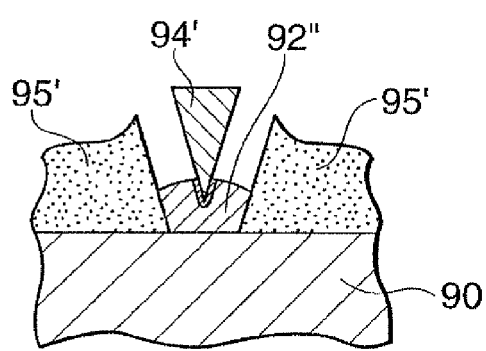

Then, etching is performed using an alkaline solution with the baked resist layer 95' being left to preferentially remove the seed layer 93' and the nonmagnetic layer 92' from the side surfaces of the magnetic layer 94' as illustrated in FIG. 9*i*. However, the seed layer 93' and the nonmagnetic layer 92' on the side surfaces of the magnetic layer 94' are removed partway and a lower portion of the seed layer 93' and the nonmagnetic layer 92' and the nonmagnetic layer 92' under the magnetic layer 94' are not removed but are left as a nonmagnetic layer 92". If the nonmagnetic layer 92' is made of alumina, an alkaline solution is used as the etchant so as not to etch NiFe. An alkaline solution may also be used if the nonmagnetic layer 92' is made of Cu or silicon (Si).

Then, the remaining resist pattern 95' is removed as illustrated in FIG. 9*j* by cleaning with an organic solvent or ashing, for example.

Then, a nonmagnetic layer 96 of alumina is formed on the top as illustrated in FIG. 9*k* by using a method such as ALD. The nonmagnetic layer 96 will act as a side shield gap layer formed on the side surfaces of the magnetic layer 94', which will be the main pole. Since the nonmagnetic layer 92" is left on a portion of the side surfaces of the magnetic layer 94' and under the magnetic layer 94', the nonmagnetic layer under the magnetic layer 94' is prevented from becoming discontinuous and separated to form space in the region even if the nonmagnetic layer 96 is very thin. Accordingly, an unwanted lower shield layer will not be formed in such space in the subsequent shield layer formation process. That is, distortion of the shape (deformation) of the side shield layer is prevented.

Figure 9L:
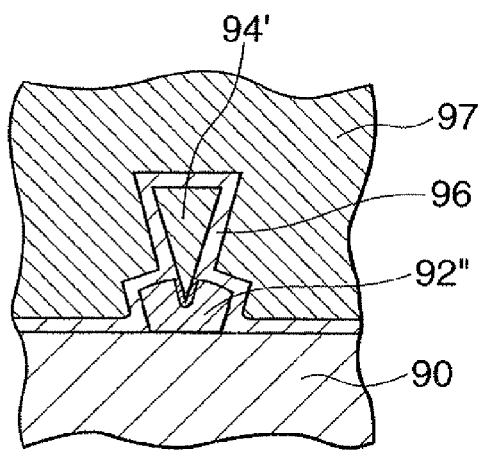

Then, the side shield layer 97 is formed on the top as illustrated in FIG. 9*l* by plating with a magnetic material.

In the present embodiment, the magnetic layer 94' is formed and then development or ashing of the applied resist layer 95 is performed partway, the remaining resist layer 95' is baked, and the nonmagnetic layer 92' is removed from at least the side surfaces of the magnetic layer 94' by etching with the resist layer 95' being left, as has been described above. Accordingly, only a portion of the nonmagnetic layer 92' on the side surfaces of the magnetic layer 94' that is not protected by the remaining resist layer 95' is removed whereas the lower portion of the nonmagnetic layer 92" on the side surfaces of the magnetic layer 94' and the nonmagnetic layer 92" under the magnetic layer 94' are not removed. Consequently, the nonmagnetic layer under the main pole is prevented from becoming discontinuous and separated to form space in the region when the thickness of the side shield gap layer on the side surfaces of the main pole is significantly reduced. Therefore, formation of an unwanted lower shield layer in such space in the subsequent shield layer formation process is prevented. That is, a side shield layer of a desired shape without deformation can be formed.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method of forming a magnetic pole section of a perpendicular magnetic recording type thin-film magnetic head, the forming method comprising:
   a first step of forming on an under layer a resist pattern having an opening;
   a second step of forming a first nonmagnetic layer to cover at least an interior wall in the opening of said resist pattern so as to narrow the opening;
   a third step of forming a first magnetic layer to fill at least the opening in which said first nonmagnetic layer has been formed;
   a fourth step of forming a magnetic layer pattern in the opening by selectively removing said first nonmagnetic layer and said first magnetic layer until said resist pattern is exposed;
   a fifth step of removing said resist pattern and then applying a resist layer onto said first nonmagnetic layer and said magnetic layer pattern;
   a sixth step of developing or ashing partway to remove a part of the applied resist layer and baking the remaining resist layer to improve its etch resistance;
   a seventh step of removing said first nonmagnetic layer from at least a side surface of said magnetic layer pattern by etching while leaving the baked resist layer;
   an eighth step of removing all of the resist layer and then forming a second nonmagnetic layer on said magnetic layer pattern; and
   a ninth step of forming a second magnetic layer on the formed second nonmagnetic layer.

2. The method as claimed in claim 1, wherein said seventh step comprises a step of removing said first nonmagnetic layer except a portion of said first nonmagnetic layer.

3. The method as claimed in claim 1, wherein said seventh step comprises a step of removing the entire first nonmagnetic layer.

4. The method as claimed in claim 1, wherein said eighth step comprises a step of forming said second nonmagnetic layer by using an atomic layer deposition method.

5. The method as claimed in claim 1, wherein said fourth step comprises a step of removing said first nonmagnetic layer and said first magnetic layer by polishing.

6. The method as claimed in claim 1, wherein said third step comprises a step of forming a seed layer on said first nonmagnetic layer and then growing a plated layer on said seed layer to form said first magnetic layer.

7. The method as claimed in claim 1, wherein said ninth step comprises a step of forming a seed layer on said second nonmagnetic layer and then growing a plated layer on said seed layer to form said second magnetic layer.

8. A method of manufacturing a perpendicular magnetic recording type thin-film. magnetic head, the manufacturing method comprising;
   a first step of forming on an under layer a resist pattern having an opening;
   a second step of forming a first nonmagnetic layer to cover at least an interior wall in the opening of said resist pattern so as to narrow the opening;
   a third step of forming a first magnetic layer to fill at least the opening in which said first nonmagnetic layer has been formed;
   a fourth step of forming a magnetic layer pattern in the opening by selectively removing said first nonmagnetic layer and said first magnetic layer until said resist pattern is exposed;
   a fifth step of removing said resist pattern and then applying a resist layer onto said first nonmagnetic layer and said magnetic layer pattern;
   a sixth step of developing or ashing partway to remove a part of the applied resist layer and baking the remaining resist layer to improve its etch resistance;
   a seventh step of removing said first nonmagnetic layer from at least a side surface of said magnetic layer pattern by etching while leaving the backed resist layer;
   an eighth step of removing all of the resist layer and then forming a second nonmagnetic layer on said magnetic layer pattern; and
   a ninth step of forming a second magnetic layer on the formed second nonmagnetic, layer.

9. The method as claimed in claim 8, wherein said seventh step comprises a step of removing said first nonmagnetic layer except a portion of said first nonmagnetic layer.

10. The method as claimed in claim 8, wherein. said seventh step comprises a step of removing the entire first nonmagnetic layer.

11. The method as claimed in claim 8, wherein said eighth step comprises a step of forming said second nonmagnetic layer by using an atomic layer deposition method.

12. The method as claimed in claim 8, wherein said fourth step comprises a step of removing said first nonmagnetic layer and said first magnetic layer by polishing.

13. The method as claimed in claim 8, wherein said third step comprises a step of forming a seed layer on said first nonmagnetic layer and then growing a plated layer on said seed layer to form said first magnetic layer.

14. The method as claimed in claim 8, wherein said ninth step comprises a step of forming a seed layer on said second nonmagnetic layer and then. growing a plated layer on said seed layer to form said second magnetic layer.

* * * * *